US007811420B2

(12) United States Patent
Sonander

(10) Patent No.: US 7,811,420 B2
(45) Date of Patent: Oct. 12, 2010

(54) ISOTHERMAL GAS-FREE WATER DISTILLATION

(76) Inventor: Sven Olof Sonander, 5 Spencerfield Steadings, Hillend by Dunfermline, Fife (GB) KY11 9LA ( * ) Notice: Subject to any disclaimer, the term of this patent is extended or adjusted under 35 U.S.C. 154(b) by 862 days.

(21) Appl. No.: 11/507,163

(22) Filed: Aug. 21, 2006

(65) Prior Publication Data
US 2006/0278079 A1    Dec. 14, 2006

(30) Foreign Application Priority Data
Feb. 22, 2005    (WO)    ............... PCT/GB2005/000651

(51) Int. Cl.
*B01D 3/10*    (2006.01)
*B01D 3/42*    (2006.01)
*B01D 19/00*    (2006.01)
*C02F 1/04*    (2006.01)
*C02F 1/20*    (2006.01)

(52) U.S. Cl. ............................... 203/1; 95/243; 95/244; 95/266; 96/157; 96/173; 96/174; 96/193; 159/44; 159/DIG. 16; 202/160; 202/176; 202/81; 202/205; 203/2; 203/10; 203/11; 203/39; 203/91; 203/DIG. 4; 203/DIG. 17

(58) Field of Classification Search .................... 159/44, 159/DIG. 16; 202/160, 176, 181, 205, 206; 203/1, 2, 4, 10, 11, 39, 91, DIG. 4, DIG. 17; 95/243, 244, 246, 247, 266; 96/157, 173, 96/174, 193
See application file for complete search history.

(56) References Cited

U.S. PATENT DOCUMENTS 3,699,006 A    10/1972    Hasslacher .................... 203/4

| 4,219,725 A | * | 8/1980 | Groninger | .................... | 392/396 |
| 4,755,201 A | * | 7/1988 | Eschwey et al. | ............... | 62/637 |
| 6,004,433 A | * | 12/1999 | Borzio et al. | ................... | 203/1 |
| 2003/0127400 A1 | * | 7/2003 | Kresnyak et al. | ............ | 210/767 |
| 2004/0099522 A1 | * | 5/2004 | Neubert et al. | ................ | 203/10 |

FOREIGN PATENT DOCUMENTS

DE    31 43 459    5/1983
DE    33 21 861    12/1984
WO    WO 2005/082784    2/2005

OTHER PUBLICATIONS

Written Opinion of the International Searching Authority (re International Application No. PCT/GB2005/000651).
*Analysis of an Innovative Water Desalination System Using Low-Grade Solar Heat*, Authors: S. Al-Kharabsheh and D. Yogi Goswami / Desalination 156 (2003) 323-332.
Perry's Chemical Engineers' Handbook 1999; Seawater Extractors, 1999, pp. 11-114-11-115; McGraw-Hill Companies, Inc.

* cited by examiner

*Primary Examiner*—Virginia Manoharan
(74) *Attorney, Agent, or Firm*—Young Basile Hanlon & MacFarlane, PC

(57) ABSTRACT

A method of and apparatus is disclosed for water desalination including steps of transferring water vapor from salt-water in a vaporization zone 7, via a water vapor transfer zone 12, to a condensation zone 11, and condensing the water vapor into fresh-water. The water vapor transfer zone 12 is maintained substantially free of any gas other than water vapor. Heat is supplied to the vaporization zone 7 and extracted from the condensation zone 11, at relative rates such that there is a net transfer of water from the vaporization zone to the condensation zone. Also disclosed is a method of and apparatus for degassing salt water using at least two degassing chambers 17A, 17B each provided with a valved vent 47 and a valved inlet 21,29,90,91, with a valved pipe circuit 17*a*, 72-82,85-87, having a pump 71. pump and valved circuit transfer water from one chamber 17A to another 1713 so as to reduce the pressure in the one chamber 17A inducing the release of dissolved gas, and expelling gas above the water out of the other chamber 1713. The direction of water transfer is then reversed so as to release dissolved gas in the other chamber 17B and expel gas in the one chamber 17A.

21 Claims, 3 Drawing Sheets

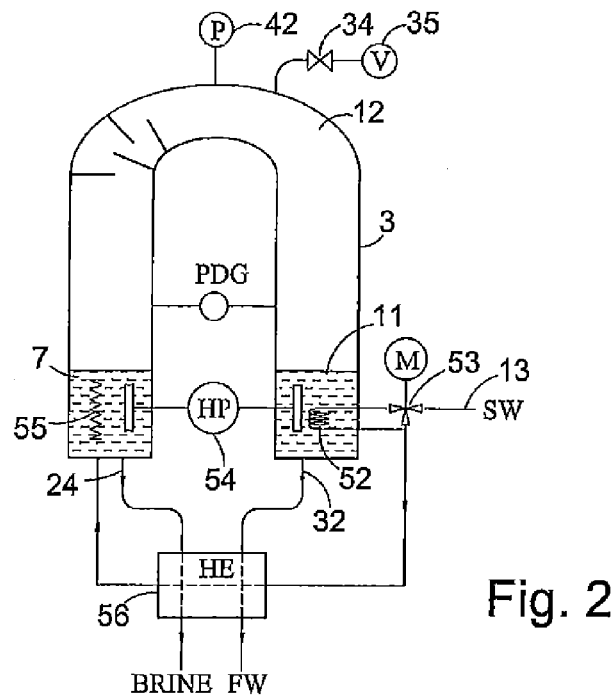
Fig. 2
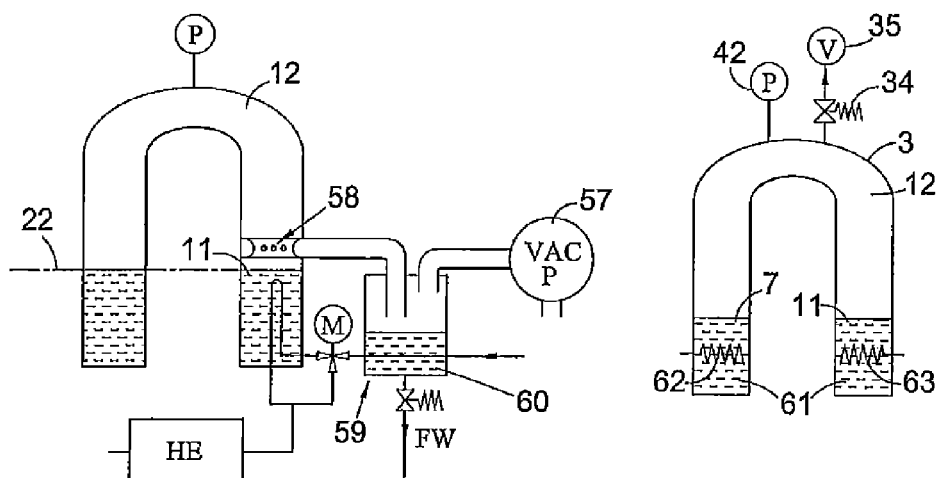
Fig. 3
Fig. 4

ISOTHERMAL GAS-FREE WATER DISTILLATION

RELATED APPLICATIONS

This application claims priority to PCT Application No. PCT/GB2005/000651, dated Feb. 22, 2006, the content of which is incorporated herein by reference. That application claims priority to GB Application No. 0404270.1 filed Feb. 26, 2004.

FIELD OF THE INVENTION

The present invention relates to water desalination, and more particularly to methods and apparatus for water desalination with improved economic efficiency.

BACKGROUND OF THE INVENTION

Many areas of the world do not have sufficient water delivered by the forces of nature to satisfy the population's needs to survive. If these areas suffer the consequences of drought then many people will die through lack of water or by drinking contaminated water: Their crops will fail, their animals will die and recovery from the famine will be a long and painful process.

Technology to purify salt or brackish water has been constantly developed since the 19th Century when people knew that it was a simple matter to boil water and condense the vapour on a surface having a low temperature. Reclaiming the heat energy needed to boil the water in order to use the same energy again proved to be more difficult. Various attempts have been made to improve the energy efficiency of water desalination over the years but these have generally been more or less complex and cumbersome, and of relatively limited efficacy.

It is an object of the present invention to avoid or minimize one or more of the above problems and/or disadvantages.

SUMMARY OF THE INVENTION

The present invention provides a method of water desalination comprising the steps of:

transferring water vapour from salt-water in a vapourization zone, via a water vapour transfer zone, to a condensation zone, and condensing said water vapour into fresh-water in said condensation zone, by maintaining said water vapour transfer zone substantially free of any gas other than water vapour, while supplying heat to said vapourization zone and extracting heat from said condensation zone, at relative rates such that there is a net transfer of water from said vapourization zone to said condensation zone.

It will be appreciated that in order for such a net transfer to take place, due to the relatively slightly higher boiling point of seawater compared with that of fresh water, it will be necessary for the relative heat extraction and supply rates to be such that, the temperature of the water surface at the vapourization zone will be slightly higher than that at the condensation zone—corresponding to a temperature differential of the order of 0.6° C. in the case of standard seawater.

Preferably the method includes the preliminary step of substantially degassing the seawater prior to said vapourization thereof.

In another aspect the present invention provides an apparatus suitable for use in water desalination comprising:

a vapourization chamber for holding salt-water, in use of the apparatus, and having a water vapour outlet connected via a water vapour transfer conduit to a condensation chamber for condensation of water vapour transferred from said vapourization chamber into fresh-water, in use of the apparatus, said condensation zone having a heat extraction device formed and arranged for extracting heat from said condensation zone at a rate relative to that at which heat is supplied, in use of the apparatus, at said vapourization chamber such that there is a net transfer of water from said vapourization zone to said condensation zone, and said apparatus being provided with an evacuation device formed and arranged for rendering said water vapour transfer conduit substantially free of any gas other than water vapour.

Preferably the apparatus is provided with a degassing device formed and arranged for degassing of seawater prior to introduction thereof into the vapourization chamber, in use of the apparatus.

For the avoidance of doubt, once the system is operating in balance, essentially all of the water vapour liberated at the vapourization zone is condensed at the condensation zone, though of course there will always remain some water vapour present in the water vapour transfer zone.

Also for the purposes of convenience and conciseness, references to gas-free hereinafter are intended to indicate free of gas other than water and similar expressions are intended to be construed correspondingly.

The basic principle of the present invention is that when all the gas in the water vapour transfer zone is removed, the water in both zones will be at the same temperature (if one assumes the dissolved solids in seawater do not influence the equilibrium water vapour pressure). In practice with standard seawater (which has a salt content of around 3.1% w/w), there would be a temperature differential of about 0.6° C. Accordingly, given the above, then regardless of the actual water temperature, both bodies of water (salt and fresh) will be at boiling point and have closely similar temperatures, the rate of net transfer of water from the salt water to the fresh water being controlled by the relative rates of heat supply and heat extraction at the respective sides of the distillation chamber. Given the approximately isothermal nature of the process of the invention, it may conveniently be referred to as "isothermal" for the sake of conciseness.

If heat is applied to the vapourization zone, the water will immediately boil. The water molecules will flash over to the condensation zone and condense and transfer their latent heat to the condensation zone. The temperature in both zones will rise if the heat applied in the vapourization zone is not extracted in the condensation zone. Some water molecules will remain in the vapour phase if the heat embodied in the vapour phase is not extracted at the condensation zone because then the water temperature will increase and the saturated water vapour pressure will rise accordingly. It is therefore necessary to balance the heat input at the vapourization zone with heat extraction at the condensation zone if the temperature of the system is to remain constant. Confirmation of balance in the system is obtained by observing a stable water temperature. If, in spite of this stability, the pressure of the atmosphere increases, then the pressure increase would normally be due to the ingress of a gas other than water vapour.

The above process can be operated at any convenient temperature. Whilst relatively high temperatures (above 90° C.) will produce relatively high water vapour pressures (above 700 mbar), the process can also be usefully operated at significantly lower temperatures. Thus for example at 60° C. water has a saturation vapour pressure (SVP) of around 200 mbar, whilst at 30° C. the SVP is 42.43 mbar, which will still allow water distillation to proceed at a practically useful rate.

Lower temperatures are generally preferred because this reduces the requirement for thermal insulation and the possibility of scaling. Hence, by way of illustration, the vapourization and condensation zones will be at temperatures that correspond to the saturated water vapour pressure thereat. Standard seawater boils at about 1° C. above the boiling temperature of pure water. Therefore, if we boil seawater at 31° C. in the vapourization zone, then it will condense in the condensation zone at a temperature of around 30° C. assuming that no condensation occurs in the transfer zone ducting.

It will be appreciated that the most suitable operating temperature in any given situation will depend on a number of different factors, including ambient temperature, heat extraction method used, temperature of salt water available for use in heat extraction (where this is the means employed for heat extraction), means available for pre-heating of salt-water prior to introduction thereof into the vapourisation chamber, etc. Where cool seawater is used for heat extraction, it would generally be desirable to use an operating temperature in the vapourisation chamber of around 5 to 10° C. below ambient.

It will be understood that the amount of heat supplied to the salt-water in the vapourization zone will be more or less directly proportional to the rate of evaporation therefrom and the same amount of heat should be simultaneously extracted from the fresh water in the condensation zone if the temperatures of boiling and condensation in the system are to remain constant.

Thus I have found that by using a water vapour transfer conduit, which is substantially free of any gas other than water vapour, it is possible to reduce substantially the energy required to distil water and the need to supply sensible heat to reach a boiling point can be substantially reduced. Furthermore the process can readily be powered by low-grade renewable energy. More particularly it is possible to reduce the temperature at which vapourization is effected, as well as substantially avoiding the need for a temperature differential between the vapourization and condensation zones, both of which can yield significant energy savings as well as opening up the possibility of using various alternative economical systems and sources of renewable energy for operation of the system.

It will be appreciated that the degree of benefit (in terms of energy efficiency) obtainable with the present invention, will depend on the degree of freedom from any gas other than water vapour i.e. the partial pressure of such gases. On the other hand the law of diminishing returns indicates in practice that the partial pressure of such gases (air and/or any other gases which might be present) do not need to be reduced to zero. In general the partial pressure of such gases should be not greater than 20% of the water vapour pressure, preferably within 10% of the water vapour pressure, most preferably within 5% thereof, within the water vapour transfer zone at the operating temperature of the system.

In a further aspect the present invention provides a method of degassing salt water comprising the steps of:

providing at least two degassing chambers each provided with a valved vent and a valved inlet, with a valved pipe circuit for providing connections from said chambers to an incoming salt water supply, to a degassed salt water supply reservoir, and to each other, said pipe circuit having a pump, said pump and valved circuit being formed and arranged, for:

transferring salt water from either one of said at least two chambers to the other, and allowing degassed salt water to be transferred out of said connection to said degassed salt water supply reservoir, introducing salt water into each of said chambers with a volume of gas above the water;

isolating one said chamber from the atmosphere;

transferring water from said one chamber to the other so as to reduce the pressure in said one chamber inducing the release of dissolved gas therefrom, and expelling gas above the water in said other chamber out of said other chamber;

isolating the other said chamber from the atmosphere, and reversing the direction of water transfer so as to induce the release of dissolved gas from the water in said other chamber and expelling gas above the water in said one chamber.

It will be appreciated that the water transfer steps may be repeated as many times as required, in order to achieve a desired degree of degassing. Typically though the water in each chamber would be subjected to at least two degassing steps, preferably from 2 to 4 steps.

The water transfer between the chambers may be effected by pumping water directly from one chamber to the other. Alternatively, though, each of the chambers is connected to a respective transfer reservoir, having a water surface exposed to atmospheric pressure (preferably via a non-gas permeable cover) at a level below the chamber such that the head of water supported by a vacuum in the chamber, corresponds to a desired water level inside the chamber, and the pump is used to transfer water between the transfer reservoirs, which in turn change the water levels inside the chambers.

In general the desired water level will be such that a substantial amount of water inside the chamber can be effectively degassed, there being a sufficient volume above the desired level to accommodate gas released from the water. Typically the desired water level would correspond to from 50 to 90% of the chamber volume, preferably from 60 to 80% of the chamber volume.

In the case where such transfer reservoirs are used, there would desirably be included the preliminary steps of:

completely filling each of the chambers, isolating the chambers from the atmosphere, and then draining water out of the chambers into the transfer reservoirs, to the desired water level inside the chambers.

In yet a further aspect the present invention provides an apparatus suitable for use in the degassing of water, which apparatus comprises:

at least two degassing chambers each provided with a valved vent and a valved inlet, with a valved pipe circuit for providing connections from said chambers to an incoming salt water supply, to a degassed salt water supply reservoir, and to each other, said pipe circuit having a pump, said valved circuit being switchable between a plurality of different configurations, with respective configurations providing for:

transferring salt water from either one of said at least two chambers to the other, and allowing degassed salt water to be transferred out of said connection to said degassed salt water supply reservoir, introducing salt water into each of said chambers with a volume of gas above the water;

isolating one said chamber from the atmosphere;

transferring water from said one chamber to the other so as to reduce the pressure in said one chamber inducing the release of dissolved gas therefrom and expelling gas above the water in said other chamber out of said other chamber;

isolating the other said chamber from the atmosphere, and reversing the direction of water transfer so as to induce the release of dissolved gas from the water in said other chamber and expelling gas above the water in said one chamber.

In one preferred form of the invention each of the chambers is connected to a respective transfer reservoir, having a water surface exposed to atmospheric pressure (preferably via a non-gas permeable cover) at a level below the chamber such that the head of water supported by a vacuum in the chamber, corresponds to a desired water level inside the chamber, and the pump is formed and arranged to transfer water between the transfer reservoirs, which in turn change the water levels inside the chambers.

It will be understood that, in order to maintain the required temperature differential between the vapourization and condensation chambers, it is also necessary to supply heat to the vapourization chamber—directly and/or indirectly, i.e. by transfer of heat to salt-water in the vapourization chamber and/or by supplying pre-heated salt-water to the vapourization chamber. Preheating the seawater is beneficial as it significantly increases the freshwater output. This can be done by constructing a separate lagoon to receive solar energy. In a hot climate the energy from the sun can be as high as 1 kW/m$^2$. A lagoon with a surface area one square kilometre could thus receive 1,000,000 kW of energy. Solar ponds are commonplace but, to most efficiently utilize the available energy, the following novel ideas should be desirably incorporated.

The lagoon should preferably be rectangular and constructed to create a laminar flow, seawater entering at one end and exiting hot at the opposite end. The flow-rate needs to be adjustable according to the energy available as dictated by weather conditions. Obviously it should also incorporate a transparent film above the water to prevent latent heat loss through evaporation and black, radiation absorbing material as or close to the base. Especially where only limited solar energy is available, pre-heating of the salt-water may also readily be effected in any other convenient way available, for example using one or more of: drawing off heat from the condensation zone (via a heat exchange device [this would require to be used in combination with another energy source] and/or via a heat pump), and relatively low grade, high volume energy sources such as sensible heat in ambient salt-water [this would also require to be supplemented by another energy source] and/or renewable energy sources such as wave power, tidal power, wind power, water flow power etc.

Where used, suitable heat pumps generally comprise a heat exchange fluid circuit having a compressor, an evaporator and a flow restrictor, through which circuit is circulated a heat exchange fluid which is alternately liquefied and vapourized in order to give out and absorb, respectively, heat energy. Other kinds of heat pumps, including thermoelectric devices based on the Peltier effect, could also be used. Such devices are very widely used in refrigeration and constitute a well proven and economically available technology.

It is possible, in principle, to utilize heat pumps driven by any convenient energy source, including electricity obtainable using renewable or non-renewable energy sources. Most advantageously, though, there is used a mechanical heat pump i.e. a heat pump driven directly by a renewable energy source such as wind, water (hydro), or wave power which provides mechanical energy which can be used to drive the heat pump compressor directly—without the need for converting the mechanical energy into electricity etc and/or storing it, as this is particularly energy efficient.

Preferably there is used at least one heat pump formed and arranged for extracting heat from the water vapour and freshwater in the condensation zone and returning this energy to the vapourization zone for further vapourization. Alternatively there may be used at least one heat pump for extracting latent heat from the water vapour in the condensation zone, and at least one heat pump for extracting sensible heat from freshwater obtained by condensation of water vapour.

In certain locations nature provides two large neighbouring masses of water having a finite temperature differential sufficient for use in driving the system on which the present invention is based. Examples of suitable naturally occurring situations include:

hot springs in or near the sea; warm rivers flowing into cold seas; and cold water from the bottom of the sea and warm water from the surface.

In order to remove any gas other than water vapour from the water vapour transfer zone, this is normally evacuated before distillation is initially commenced, and, if required, periodically in order to remove any gas other than water vapour which has been introduced in the salt-water supply (as a dissolved gas therein). Evacuation may readily be achieved by means of a mechanical pump, or by using a water-column evacuation arrangement such as that illustrated in the accompanying drawings and detailed description thereof. Another method of removing any gas other than water vapour which may be used, involves boiling salt and fresh water in the vapourization and condensation zones at atmospheric pressure, for a period of time sufficient to displace all or most of the air from the water vapour transfer zone. A temperature sensor at the steam exit point confirms when 100° C. has been reached.

In order to maximize energy efficiency in the apparatus of the invention, this may be thermally insulated at the vapourization zone so as to maximize water vapourization in relation to the heat input to the vapourization chamber. It is, however, another benefit of the present invention that the need for such measures is reduced in comparison to previously known desalination systems. Nevertheless in many countries where desalination is needed, the ambient temperatures can be relatively high—possibly up to 40° C. or so. Accordingly where a lower distillation temperature (below 40° C.) is used, then it may be advantageous to dispense with insulation to a greater or lesser extent and make use of this heat to pre-heat the seawater supply.

It will be appreciated that the method and apparatus of the present invention may be used for obtaining fresh-water from any convenient source of water containing dissolved solids, including, for example, sea-water, brackish water, water from salt-marshes, fresh-water contaminated with chemicals such as fertilisers, etc and all such sources are intended to be encompassed by references herein to salt-water, unless the contrary is specifically indicated.

It will be appreciated that in order to maintain the water vapour transfer zone substantially free of any gas other than water vapour, it will be necessary to manage the inflow of salt-water and the out-flow of fresh water to the apparatus, in an appropriate manner. One possibility would be to operate in a batch-wise mode. Nevertheless it would generally be preferable to operate in a generally continuous mode. One option would be to use a suction pump to extract the fresh-water and brine (i.e. the salt-water with increased salt concentration remaining after vapourization of water therefrom), in order to maintain the water transfer zone free of any gas other than water vapour and under partial vacuum. As an alternative a down fall pipe having an outlet below a surface of water that is exposed to the atmosphere, where the distance between this water surface and the water surface in the distillation chamber exceeds around 10 m, would enable the water to be drained by gravity. Suitable valve and control mechanisms (water level sensors etc), may be used to control this flow and maintain suitable water levels in the condensation zone and vapourization zone. It will be appreciated that at the vapourization zone side, it will be necessary to control both the inflow of salt-water and the outflow of brine.

In order to avoid adverse environmental impacts and minimize maintenance requirements for the apparatus resulting from excessively high salt concentrations, the method and apparatus of the invention are generally operated so as to limit the amount of fresh water extracted from the salt-water in generally known manner. Desirably the amount of freshwater extracted should be limited so that the residual salt (dissolved solids) concentration in the salt-water discharge produced is not more than 100%, preferably not more than 50%, most preferably not more than 25%, greater than that in the salt-water intake.

Yet another benefit of the reduced operating temperatures, which can be employed with the present invention, is a reduction in problems such as corrosion and scaling.

In a further aspect the present invention provides a method of water desalination comprising the steps of:

transferring water vapour from salt-water in a vapourisation zone, via a water vapour transfer zone, to a condensation zone, and partly condensing said water vapour into freshwater in said condensation zone, by maintaining a temperature differential between said vaporisation zone and said condensation zone, and said water vapour transfer zone being substantially free of any gas other than water vapour.

In yet another aspect the present invention provides an apparatus suitable for use in water desalination comprising:

a vapourization chamber for holding salt-water, in use of the apparatus, and having a water vapour outlet connected via a water vapour transfer conduit to a condensation chamber for condensation of water vapour transferred from said vapourization chamber into fresh-water, in use of the apparatus, said condensation zone having a cooling device formed and arranged for maintaining a temperature differential between said vaporisation chamber and said condensation chamber, in use of the apparatus, and said apparatus being provided with an evacuation device formed and arranged for rendering said water vapour transfer conduit substantially free of any gas other than water vapour.

BRIEF DESCRIPTION OF THE DRAWINGS

Further preferred features and advantages of the invention will appear from the following more detailed description and the detailed description given by way of illustration with reference to the accompanying drawings in which:

FIG. 2 is a detail view of part of another embodiment;

FIGS. 3 and 4 are detail schematic views showing alternative arrangements for removing atmosphere contaminated with gas other than water vapour, from the water vapour transfer zone;

FIG. 7 is a detail view showing a modification to the system of FIG. 1.

DETAILED DESCRIPTION OF THE ILLUSTRATIVE EMBODIMENT

Figure 1:
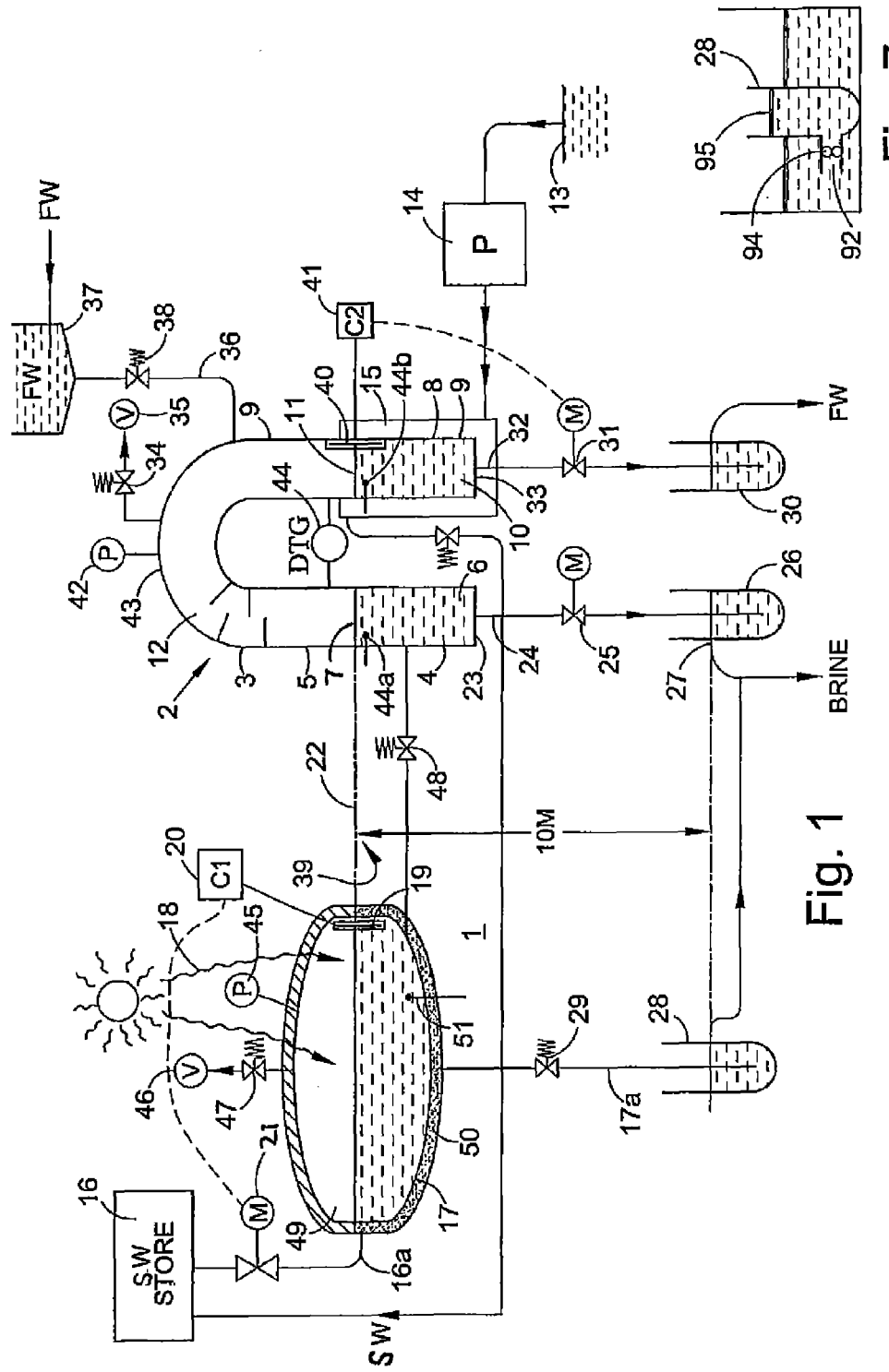
FIG. 1 is schematic sectional view of a basic form of desalination system according to the present invention.

FIG. 1 shows a desalination system 1 incorporating a desalination apparatus 2 according to the present invention. The apparatus 2 has an inverted, generally "U"-shaped, chamber 3 with an end portion 4 of one limb 5 for holding salt-water 6 in a vapourization zone 7 and an end portion 8 of the other limb 9 for receiving fresh-water 10 at a condensation zone 11, separated from the vapourization zone 7 by a central water vapour transfer zone 12.

A salt-water supply 13 is pumped 14 via a heat exchange device 15 in thermal connection with the condensation zone 11, to a solar heated salt-water reservoir 16. This feeds a pre-heat and degassing chamber 17 which receives solar energy 18, via a conduit 16a, and has a level sensor 19 coupled to a controller 20, which operates a motorized valve 21 in the conduit 16a, to control the supply of salt-water to the pre-heat degassing chamber 17. The latter is arranged at a height relative to the chamber 3, so that it can maintain a predetermined water level 22 in the chamber 3 (as explained in more detail hereinbelow).

The end 23 of said one limb 5 of the chamber 3 has a brine outlet 24 connected via a motorized valve 25 to a first air-trap 26 which has a water outflow 27 open to ambient pressure, at a height around 10 m below the desired water level in vapourization zone 7. The outflow 27 is coupled to a corresponding air-trap 28 coupled in turn, via a conduit 17a provided with a motorized valve 29, to the pre-heat and degassing chamber 17. A further corresponding air-trap 30 is similarly connected via a motorized valve 31 to a fresh-water outlet 32 in the end 33 of said other limb 9 of the chamber 3.

The central water vapour transfer zone 12 portion of the chamber 3 has a valved 34 vent 35 for venting off air therefrom, and is also connected 36 to a fresh-water supply 37, via a valve 38, which is used for filling up the chamber initially, before commencing distillation, so as to displace air from the chamber 3. Once all the air has been expelled, the fresh-water supply valve 38 and the vent valve 34 are closed. Thereupon the motorized valves 25, 31 controlling the brine and freshwater outlets 24, 32, respectively, of the chamber 3, are opened. Water then flows out of the chamber 3 therethrough, until the head of water 39 in the chamber 3 and outlets 24, 32 balances the ambient atmospheric pressure. The level of this head 39 is arranged to correspond to the abovementioned predetermined level 22 in the vapourization zone 5 and also corresponds to a pressure in the water vapour transfer zone 12 (excluding any water vapour partial pressure) of around zero. Of course the remaining water in the chamber 3 will then immediately begin to vaporize until a water vapour pressure determined by the temperature in the chamber, is reached inside the water vapour transfer zone 12. At a temperature around 30° C. this pressure would be around 42.43 mbar (as discussed hereinbefore) whilst at temperature of 60° C. it would be 200 mbar.

The condensation zone 9 is also provided with a level sensor 40 coupled to a controller 41, which operates the motorized valve 31 controlling the outflow of fresh-water from the condensation zone 9, in order to maintain the desired water level in the condensation zone 11 of the chamber 3, for effective heat transfer to the heat extraction heat exchanger 15, as more and more fresh-water condenses out thereat.

The chamber 3 is also provided with a pressure gauge 42 at its top 43 to monitor the approximate overall pressure in the water vapour transfer zone 12, and a differential temperature gauge 44 is connected across the vapourization and condensation zones 7, 11, to monitor any undesired increase in the temperature differential therebetween, which would typically be due to ambient air leaking into the chamber 3, and/or release of dissolved gases from the salt-water into the chamber 3. The presence of gas will degenerate the process from a fast flash process to a slow evaporative process. Since the detection of unwanted gas is crucial to the efficient operation of the system, secondary temperature sensors 44a and 44b monitor the vapourization zone 7 and condensation zone 11 temperatures respectively.

In use of the apparatus 2, as soon as any heat is drawn off from the condensation zone 11—by the cooler sea-water flowing through the heat exchange device 15, water vapour in the water vapour transfer zone 12 will begin to condense out at the condensation zone 11. This will then immediately result in vapourization taking place at the vapourization zone 7 to restore equilibrium in the system. As heat is continuously taken out of the condensation zone 11 by the flow of sea-water through the heat exchange device 15, there will be established a dynamic equilibrium.

The pre-heat and degassing chamber 17 is also provided with a pressure gauge 45 and a vent 46 controlled by a motorized valve 47 and may be used to de-gas the sea-water supply to the distillation chamber 3, thereby minimizing the need for any removal of gases therefrom during operation thereof, in the following manner. Valve 25 is closed off to halt outflow of brine from the distillation chamber 3, and a valve 48 controlling supply of seawater from the pre-heat and degassing chamber 17 to the vapourization zone 7, is closed. Valve 29 is closed to halt the outflow of seawater from the degassing chamber 17. Valve 21 is then opened until gauge 45 reads atmospheric pressure. Thereupon the valved vent 46, 47 is gradually opened until seawater is detected by a water sensor at vent 46. Valve 47 is then closed. The valve 29 controlling the conduit 17a connecting the pre-heat chamber 17 to the respective air-trap 28 is then opened whereupon the water level in the pre-heat degassing chamber 17 falls to below the predetermined level 22 to an extent determined by the saturated vapour pressure of the water creating a low pressure vacuum 49 above it. For example, if the water in the vapourization chamber is at 31° C. the corresponding vapour pressure is approximately 45 mb. If the water in the pre-heat degassing chamber is 65 ° C. the corresponding vapour pressure would be 250 mb. The difference of 205 mb would depress the water level in the pre-heat degassing chamber to approximately 2 meters below the predetermined level 22. The supply valve 48 may now be reopened to allow flow of seawater from the pre-heat degassing chamber 17 into the distillation chamber 3 and the brine valve 25 may be reopened to allow the outflow of brine from the distillation chamber 3. The predetermined water level 22 in the pre-heat degassing chamber 17 is maintained by means of the controller 20 periodically adjusting the opening of the supply valve 21 under the influence of the level sensor 19, to allow more seawater into the pre-heat degassing chamber 17. In order to help retain heat gained from the sun in the pre-heat degassing chamber 17, the base thereof is insulated 50. Any leakage of air into the pre-heat degassing chamber 17 or build up of released dissolved gases therein, may be readily detected by comparing the pressure therein using the pressure gauge 45 and comparing it with the water vapour pressure expected from the water temperature which is monitored by a temperature sensor 51.

FIG. 2 shows the principal parts of a modified apparatus of the invention in which like parts corresponding to those in FIG. 1 are indicated by like reference numbers. In this case the seawater supply 13 is optionally connectable to an internal heat exchange coil 52 in the condensation zone 11, via a motorized diverter valve 53. Heat is also transferred directly from the condensation zone 11 to the vapourization zone 7 by a heat pump 54. In addition a heating element 55 is provided in the vapourization zone 7. The seawater supply is also routed to the vapourization zone 7, via a heat exchanger 56 so as to take up heat from the fresh-water outflow 32 and the brine outflow 24, from the respective parts of the distillation chamber 3. This arrangement provides independent control of the heat extracted from the condensation chamber 11 by adjusting the diverter valve 53. The heater 55 provides independent control of the heat input to evaporation chamber 7. Operation of the valves and heater can thus provide fine tuning of the closely similar but different temperatures in the vapourization and condensation zones, and thereby of the distillation process.

FIG. 3 is a partial view corresponding generally to FIG. 2, showing an alternative evacuation system (which could also be used with the apparatus of FIG. 1). In this case a vacuum pump 57 is connected to an annular gas collector intake 58 mounted in the condensation zone 11 of the distillation chamber 3 just above the pre-determined water level 22 (this being where any gas other than water vapour tends to be concentrated), via a water trap 59 which protects the vacuum pump 57 by collecting any fresh-water or water vapour 60 which has been drawn out through the gas collector intake 58. If the pressure in the transfer zone 12 exceeds the saturated vapour pressure, established by the evaporation and condensation zone temperature sensors 44a, 44b, the vacuum pump 57 will operate to remove the contaminated vapour. This process has the effect of reducing the pressure in the transfer zone 12, causing increased vapourization in the vapourization zone 7 and evaporation in the condensation zone 11. This causes a net increase in the amount of fresh water produced. This water 60 collects in the water trap 59.

FIG. 4 is a partial view corresponding generally to FIG. 2, showing an alternative system for expelling air from the distillation chamber 3. In this case water 61 in the vapourization and condensation zones 7, 11 is boiled by respective heater elements 62, 63 until substantially all of the air in the water vapour transfer zone 12 has been expelled via the valved vent 34, 35 which is then closed.

The gas-free substantially isothermal desalination process of the invention can be adapted to provide outputs ranging from 1m$^3$ to several thousand tonnes per day. They can be entirely powered by renewable energy in hot, desert or arid lands. In cities where space is at a premium and it is necessary to use more or less non-renewable energy, the principles can still be applied to take advantage of the reduced energy costs required.

Regardless of size or location, degassing of the seawater prior to vapourization, is essential. Ideally the water should be degassed to an extent such that substantially no gases are released during boiling in the vapourization zone.

Figure 5:
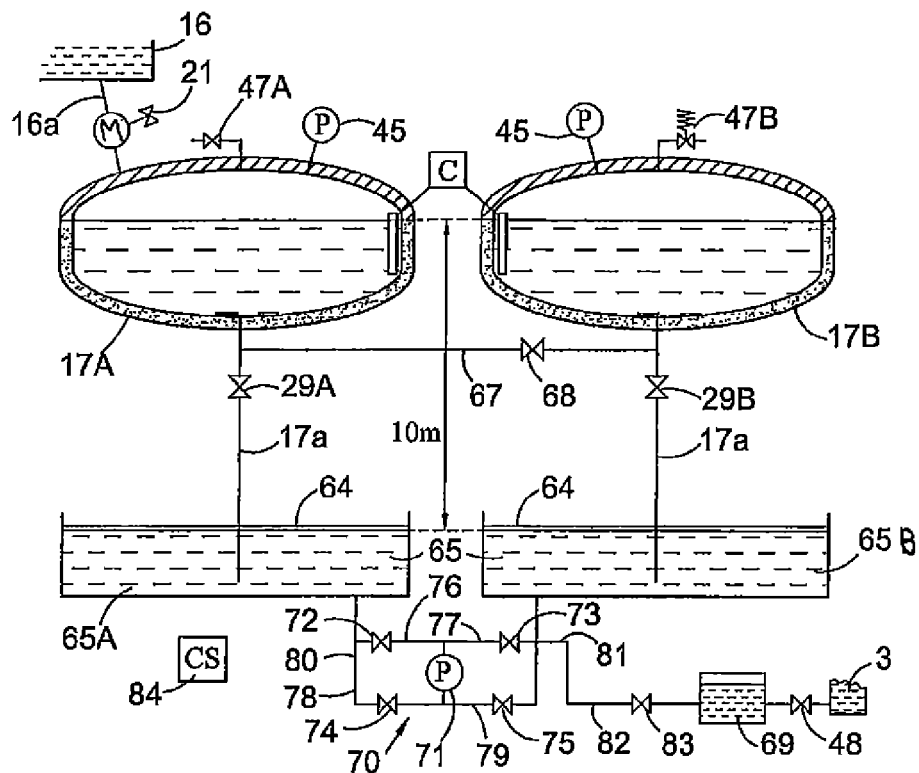
FIGS. 5 and 6 are schematic sectional views of two different embodiments of seawater degassing apparatus.
Figure 6:
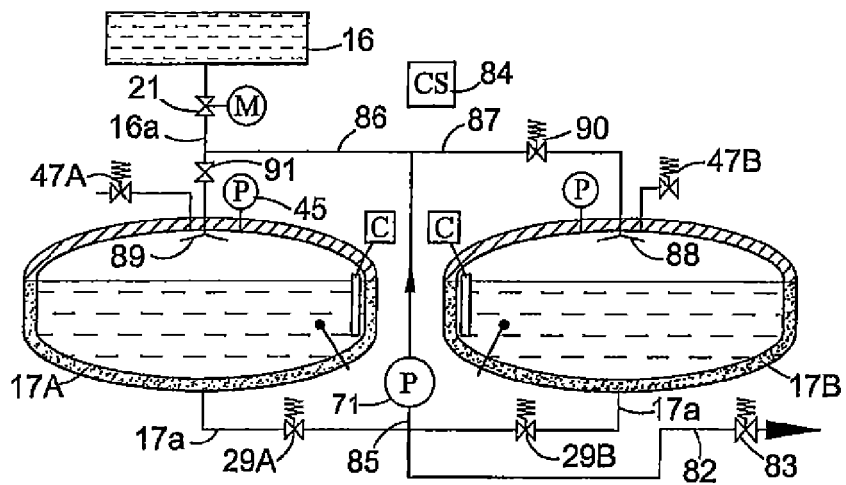

FIGS. 5 and 6 depict two ways of degassing. The apparatus shown in FIG. 5 creates a vacuum using the force of gravity and atmospheric pressure acting on floating water surface sealing covers 64, of a non-porous material that prevents gas being absorbed by respective reservoirs of seawater 65. The apparatus shown in FIG. 6 uses a water pump 66 to create a vacuum.

In more detail, FIG. 5 shows a pair of degassing chambers 17A and 17B provided with respective vent valves 47A, 47B, and each connected by a conduit 17a provided with a respective valve 29A, 29B, to a respective reservoir for degassed seawater 65A, 65B. A connecting pipe 67 provided with a valve 68 interconnects the two conduits 17a. The degassed seawater reservoirs 65A, 65B, are connected to each other and to a degassed seawater supply reservoir 69 which feeds the distillation chamber 3 via the valve 48, via a valved bridge circuit 70 provided with a pump 71. In more detail the bridge circuit 70 has a valve 72, 73, 74, 75 in each of its arms 76, 77, 78, 79, the pump 71 being connected across the bridge circuit 70, and the ends 80, 81 of the bridge circuit 70 being connected to respective degassed seawater reservoirs 65A, 65B. One end 81 is also connected to the degassed seawater supply reservoir 69 via a supply pipe 82 provided with a valve 83.

In use of the above degassing system, the degassing chambers 17A, 17B are initially filled by closing valves 29A and 29B and opening vent valves 47A, 47B, and valve 68, and valve 21 is then opened to fill both chambers 17A, 17B simultaneously from the main seawater supply 16. When water is detected at vent valves 47A, 47B, these will be closed. Then seawater supply valve 21 and interconnect valve 68 are closed and valves 29A, 29B to degassed seawater reservoirs 65A, 65B, are opened. This causes the water level in both chambers 17A, 17B to fall creating a partial vacuum above the water surface therein.

The water pump 71 is used to extract water from one chamber 17A and transfer water to the other chamber 17B. During this transfer valves 72 and 75 are open and valves 73 and 74 are closed. These four valves and the vent valves 47A, 47B are operated by an electronic control system 84 (comms links to valves not shown for clarity). When the pressure in chamber 17B has reached atmospheric pressure, valve 47B is opened to vent off vapour and gas until an electronic water detector detects water at the vent valve 47B. When water is detected the control system 84 is simultaneously closes valves 47B, 72, 75 and opens valves 73 and 74. The will cause the water flow to change direction from chamber B to chamber A. This cycle may be repeated until the seawater has been substantially completely degassed i.e. when the pressure of the atmosphere above the water is substantially equal to the saturated vapour pressure of the water—generally within 10%, most preferably within 5%. When there is only water vapour above the surface of the water (i.e. when the water has been completely degassed) this water vapour will condense as the water level rises. When atmospheric pressure is reached there will be no gas or water vapour above the water. Therefore when valves 47A or 47B open, water will instantly be detected and the valves will immediately close. When valves 47A and 47B are opening and then immediately closing degassing is complete.

FIG. 6 shows a pair of degassing chambers 17A, 17B as in FIG. 5. The outlet conduits 17a from the two chambers 17A, 17B connect to the chamber 3 via a valved 83 supply pipe 82 degassed seawater supply reservoir 69 as before. They are also connected to a return pipe 85 in line with which the water pump 71 is mounted, and which has respective branches 86, 87 connected to atomizers 88, 89, in each of the degassing chambers 17B, 17A. One branch 86 connected via the main supply conduit 16a from the main seawater supply reservoir 16, to one degassing chamber 17A, whilst the other branch 87 connects directly to the other degassing chamber 17B. In each case a respective control valve 90, 91 is provided.

To fill the system shown in FIG. 6 valves 29A, 29B and 83 are closed and vent valves 47A, 47B and valves 90, 91 are opened. Valve 21 is then opened to commence filling. When the level in either chamber 17A, 17B reaches the predetermined level shown (as detected by level sensors C), the appropriate supply valve 90 or 91 is closed. When both chambers 17A and 17B are filled the main supply valve 21 and vent valves 47A, 47B are also all closed.

The water pump 71 is then used to extract water from one chamber 17A and transfer water to the other chamber 17B. During this transfer, valves 29A, 90 and 47B are open and valves 29B and 91 are closed. All these valves are operated by an electronic control system 84 (comms links to valves not shown for clarity). When chamber 17B is full an electronic water detector detects water at the vent valve 47B. When water is detected the control system 84 simultaneously closes valves 47B, 29A, and 90 and opens valves 29B, and 91. This will cause the water flow to change direction so that it now transfers from chamber 17B to chamber 17A. When the pressure in chamber 17A reaches atmospheric pressure as detected by pressure gauge 45, valve 47A is opened. When water is detected at 47A this valve and valves 29B and 91 are closed. At this stage all the air initially present in the chambers (above the desired water level) has been expelled and the system is charged ready for degassing. Valves 29A and 90 are then opened. When the pressure in chamber 17B reaches atmospheric pressure as detected by pressure gauge 45, valve 47B is opened. When water is detected at valve 47B it is closed. This cycle may be repeated as previously described.

In both cases the degassed seawater can be transferred on to the degassed seawater supply reservoir 69 which supplies the distillation chamber 3 with a continuous supply of degassed seawater, by switching off the pump 71, and opening vent valves 47A and 47B and valves 29A, 29B, 83 (and 74, 75 in the case of FIG. 5) to allow the water to drain out from the degassing system.

It will be appreciated that various modification may be made to the above embodiments without departing from the scope of the invention. Thus, for example, in the case of FIG. 1, in order to reduce wastage of degassed seawater by outflow from the air trap 28 connected to the degassing chamber 17, said air trap 28 is advantageously connected 92 instead to a seawater reservoir 93, and provided with an impeller pump 94 which can be operated to raise the water level 95 inside the air trap 28 which will result in a corresponding rise in water level inside the pre-heat and degassing chamber 17 etc. In order to prevent the water in the air trap 28 and reservoir 93, absorbing gas again, the water surfaces are covered with a non-porous cover 64, as described earlier with reference to FIGS. 5 and 6.

It will also be understood that, advantageously, the main seawater store reservoir, will where possible, be formed and arranged to maximise solar heating of the seawater therein.

The invention claimed is:

1. A method of water degassing and desalination comprising the steps of:
    providing at least two degassing chambers each having a valved vent and a valved inlet,
    further providing a valved pipe circuit connecting said chambers to an incoming salt water supply, to a degassed salt water supply reservoir and to each other;
    said valved pipe circuit further having a pump, said pump and valved pipe circuit being arranged for transferring salt water from either of said chambers to the other and allowing degassed salt water to be transferred out of said circuit to said degassed salt water supply reservoir,
    introducing salt water into each of said chambers with a volume of gas above the water;
    isolating one of said chambers from the atmosphere;
    transferring water from said one chamber to the other so as to reduce the pressure in said one chamber while inducing the release of dissolved gas therefrom and expelling gas above the water in said other chamber out of said other chamber;
    isolating said other chamber from the atmosphere;
    reversing the direction of water transfer so as to induce the release of dissolved gas from the water in said other chamber and expelling gas above the water in said one chamber;
    and transferring substantially degassed salt water to said reservoir; and thereafter desalinating the degassed salt water by transferring water vapor in a vaporization zone, via a water vapor transfer zone, to a condensation zone, and condensing said water vapor into fresh water in said condensation zone; and
    maintaining said water vapor transfer zone substantially free of any gas other than water vapor, while supplying heat to said vaporization zone and extracting heat from said condensation zone, at relative rates such that there is a net transfer of water from said vaporization zone to said condensation zone wherein the saltwater inflow provided to the vaporization zone, after water vapor transfer has started, is sufficiently degassed so as to maintain the partial pressure of gasses in the water vapor transfer zone at no more than 20% of the water vapor pressure at the operating temperature of the system.

2. A method as claimed in claim 1 wherein the partial pressure of gases other than water vapor is maintained at not greater than 10% of the water vapor pressure within the water vapor transfer zone at the operating temperature of the system.

3. A method as claimed in claim 1 wherein the partial pressure of gasses other than water vapor is maintained at not greater than 5% of the water vapor pressure within the water vapor transfer zone at the operating temperature of the system.

4. A method as claimed in claim 1 wherein the rate of heat extraction is controlled so that vaporization is carried out at a temperature in the range of 25 to 70 ° C.

5. A method as claimed in claim 1 which includes the preliminary step of pre-heating the salt water prior to introduction thereof into the vaporization zone.

6. A method as claimed in claim 1 wherein the rate of freshwater extraction is controlled so that the residual salt concentration in the salt-water discharge produced is not more than 100% greater than that in the salt-water intake.

7. A method as claimed in claim 1 further comprising the step of monitoring the temperature of the vaporization zone and of the condensation zone during the transfer of water vapor.

8. A method according to claim 1 wherein during the degassing the salt water in each chamber is subjected to at least two degassing steps.

9. A method according to claim 8 wherein during the degassing the salt water in each chamber is subjected to from 2 to 4 degassing steps.

10. A method according to claim 1 wherein during the degassing the water transfer between the chambers is effected by pumping water directly from one chamber to the other.

11. A method according to claim 1 wherein during degassing each of the chambers is connected to a respective transfer reservoir, having a water surface exposed to atmospheric pressure, at a level below the chamber, such that the head of water supported by a vacuum in the chamber, corresponds to a desired water level inside the chamber, and the pump is used to transfer water between the transfer reservoirs, which in turn change the water levels inside the chambers.

12. A method according to claim 11 wherein said water surface is exposed to atmospheric pressure via a non-gas permeable cover.

13. A method according to claim 11 wherein said desired water level corresponds to from 50 to 90% of the chamber volume.

14. A method according to claim 11 wherein the degassing of the salt water inflow includes the preliminary steps of:
completely filling each of the chambers,
isolating the chambers from the atmosphere, and
then draining water out of the chambers into the transfer reservoirs, to the desired water level inside the chambers.

15. An apparatus suitable for use in water desalination comprising:
a vaporization chamber for holding salt water, and having a water vapor outlet connected via a water vapor transfer conduit to a condensation chamber for condensation of water vapor transferred from said vaporization chamber into fresh water, said condensation zone having a heat extraction device formed and arranged for extracting heat from said condensation zone at a rate relative to that at which heat is supplied, at said vaporization chamber such that there is a net transfer of water from said vaporization zone to said condensation zone said apparatus being provided with an evacuation device formed and arranged for rendering said water vapor transfer conduit substantially free of any gas other than water vapor, and said vaporization chamber having an inlet coupled to a degassed salt water supply reservoir of a degassing device formed and arranged for supply of degassed salt water into the vaporization chamber; wherein the degassing device comprises:

at least two degassing chambers each provided with a valved vent and a valved inlet, with a valved pipe circuit for providing connections from said degassing chambers to an incoming salt water supply, to a degassed salt water supply reservoir, and to each other, said valved pipe circuit having a pump., said valved pipe circuit being switchable between a plurality of different configurations, with respective configurations providing for: transferring salt water from either one of said at least two degassing chambers to the other, and allowing degassed salt water to be transferred out of said connection to said degassed salt water supply reservoir, means for introducing salt water into each of said degassing chambers with a volume of gas above the water;

means for isolating one said degassing chamber from the atmosphere;

means for transferring water from said one degassing chamber to the other so as to reduce the pressure in said one degassing chamber inducing the release of dissolved gas therefrom and expelling gas above the water in said other degassing chamber out of said other degassing chamber;

means for isolating the other said degassing chamber from the atmosphere, and means for reversing the direction of water transfer so as to induce the release of dissolved gas from the water in said other degassing chamber and expelling gas above the water in said one degassing chamber.

16. An apparatus as claimed in claim 15 wherein said heat extraction device comprises a heat exchanger formed and arranged for passing a coolant fluid therethrough at a controlled rate so as to maintain the water temperature in the condensation zone at a desired temperature.

17. An apparatus according to claim 15 wherein said heat extraction device comprises a heat pump.

18. An apparatus as claimed in claim 17 wherein said heat pump is a mechanical heat pump driven substantially directly by a renewable energy source.

19. An apparatus as claimed in any claim 15 further comprising temperature sensors for monitoring the temperature of the vaporization and condensation zones.

20. An apparatus as claimed in claim 15 wherein each of the degassing chambers is connected to a respective transfer reservoir, having a water surface exposed to atmospheric pressure at a level below the degassing chamber such that the head of water supported by a vacuum in the degassing chamber, corresponds to a desired water level inside the degassing chamber, and the pump is formed and arranged to transfer water between the transfer reservoirs, which in turn change the water levels inside the degassing chambers.

21. An apparatus according to claim 20 wherein the degassing device is provided a non-gas permeable cover via which said water surface is exposed to atmospheric pressure.

* * * * *